(12) United States Patent
Viswanathan

(10) Patent No.: US 10,296,828 B2
(45) Date of Patent: May 21, 2019

(54) LEARNING A SIMILARITY MEASURE FOR VISION-BASED LOCALIZATION ON A HIGH DEFINITION (HD) MAP

(71) Applicant: HERE GLOBAL B.V., Eindhoven (NL)

(72) Inventor: Anirudh Viswanathan, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 45 days.

(21) Appl. No.: 15/479,635

(22) Filed: Apr. 5, 2017

(65) Prior Publication Data
US 2018/0293466 A1    Oct. 11, 2018

(51) Int. Cl.
G06K 9/00 (2006.01)
G06N 3/08 (2006.01)
(Continued)

(52) U.S. Cl.
CPC ............ G06N 3/08 (2013.01); B60R 1/00 (2013.01); G05D 1/0246 (2013.01);
(Continued)

(58) Field of Classification Search
CPC ...... B60K 2350/1008; B60K 2350/106; B60K 2350/2013; B60K 2350/301;
(Continued)

(56) References Cited

U.S. PATENT DOCUMENTS 9,286,524 B1 *  3/2016  Mei ...................... G06K 9/6273
9,623,905 B2 *  4/2017  Shashua ................. G01C 21/32
(Continued)

FOREIGN PATENT DOCUMENTS

CN      105654067 A        6/2016
WO   WO 2016/130719 A2    8/2016
WO   WO 2016/145547 A1    9/2016

OTHER PUBLICATIONS

Carlevaris-Bianco, Nicholas D., "Long-Term Simultaneous Localization and Mapping in Dynamic Environments", Philosophy Doctoral Dissertation, 2015, 148 pages, The University of Michigan, retrieved from <http://robots.engin.umich.edu/publications/ncarlevaris-phdthesis.pdf> on Aug. 17, 2017.

(Continued)

Primary Examiner — Amara Abdi
(74) Attorney, Agent, or Firm — Alston & Bird LLP

(57) ABSTRACT

A captured image and corresponding observed pose data are captured or received. The captured image is captured by an image capturing device onboard a vehicle. The observed pose data is determined by a location sensor onboard the vehicle. The observed pose data indicates the pose of the vehicle when the image was captured. A map projection is generated based on map data and the observed pose data. The captured image and the map projection are analyzed by a pose metric network. The pose metric network determines a pose metric based on the analysis of the captured image and the map projection. The pose metric describes how similar the captured image is to the map projection.

21 Claims, 7 Drawing Sheets

(51) Int. Cl.
  G05D 1/02 (2006.01)
  B60R 1/00 (2006.01)
  G06K 9/62 (2006.01)
  H04N 7/18 (2006.01)

(52) U.S. Cl.
  CPC ......... *G06K 9/00791* (2013.01); *G06K 9/627* (2013.01); *B60K 2350/106* (2013.01); *B60K 2350/1008* (2013.01); *B60K 2350/2013* (2013.01); *B60R 2300/10* (2013.01); *B60R 2300/301* (2013.01); *B60R 2300/302* (2013.01); *G05D 1/027* (2013.01); *G05D 1/0278* (2013.01); *G06K 9/00798* (2013.01); *H04N 7/183* (2013.01)

(58) Field of Classification Search
  CPC ........... B60K 2350/302; G05D 1/0246; G05D 1/027; G05D 1/0278; G06K 9/66; G06K 9/6215; G06K 9/6256; B60R 1/00; H04N 7/183
  See application file for complete search history.

(56) References Cited

U.S. PATENT DOCUMENTS

| | | | | |
|---|---|---|---|---|
| 2008/0162038 | A1* | 7/2008 | Comer | G01C 21/30 345/620 |
| 2016/0005164 | A1* | 1/2016 | Roumeliotis | G01C 21/165 348/116 |
| 2017/0337682 | A1* | 11/2017 | Liao | G06T 7/30 |

OTHER PUBLICATIONS

Garcia-Fidalgo, Emilio, et al., "Vision-based topological mapping and localization methods: A survey", Oct. 27, 2014, 48 pages, retrieved from <http://emiliofidalgo.github.io/static/papers/journal_RAS_Garcia2015.pdf> on Aug. 17, 2017.

Hadsell, Raia, "Self-Supervised Learning in Off-Road Robots: Robust Scene Understanding for Autonomous Navigation in Unstructured Environments", Undated (latest citation is Aug. 2006), 20 pages, retrieved from <http://www.ibrarian.net/navon/paper/Self_Supervised_Learning_in_Off Road_ Robots_ Robu.pdf?paperid=12215403> on Aug. 17, 2017.

Morton, Jeremy, et al., "CS231n Project Report: Deep Learning of Spatial and Temporal Features for Automotive Prediction", last modified Mar. 23, 2016, 9 pages, retrieved from <http://cs231n.stanford.edu/reports/2016/pdfs/102_Report.pdf> on Aug. 17, 2017.

Pascoe, Geoffrey, et al., "Robust Direct Visual Localisation using Normalised Information Distance", Sep. 2015, 13 pages, retrieved from <http://www.robots.ox.ac.uk~mobile/Papers/2015BMVC_Pascoe.pdf> on Aug. 17, 2017.

Walch, Florian, "Deep Learning for Image-Based Localization", Master's Thesis in Informatics, Technische Universität München, Oct. 15, 2016, 77 pages, retrieved from <https://vision.in.tum.de/_media/members/hazirbas/teaching/walch2016msc.pdf> on Aug. 17, 2017.

Wolcott, Ryan W., et al., "Visual Localization within LIDAR Maps for Automated Urban Driving", Sep. 2014, 8 pages, retrieved from <http://robots.engin.umich.edu/pubications/rwolcott-2014a.pdf> on Aug. 17, 2017.

* cited by examiner

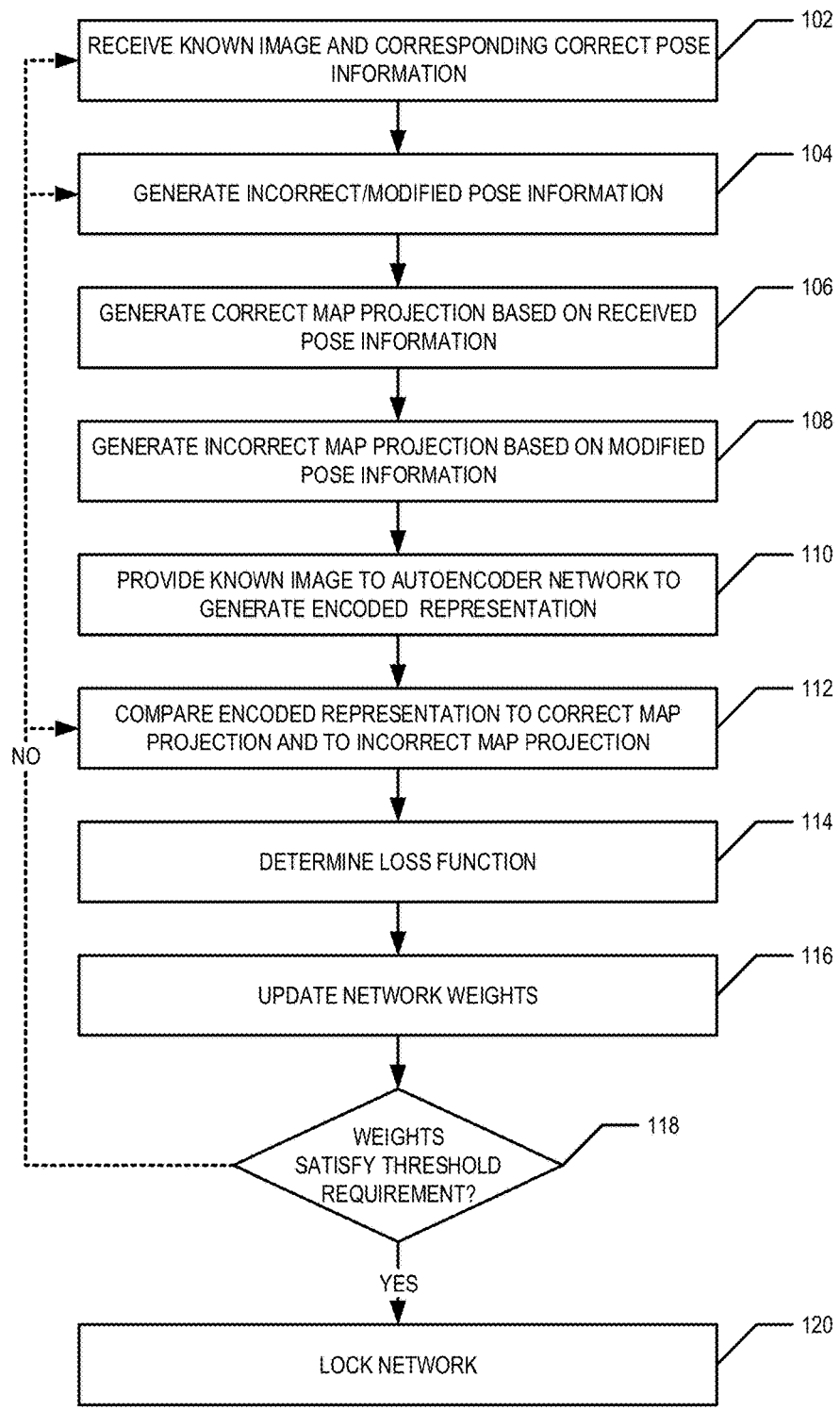

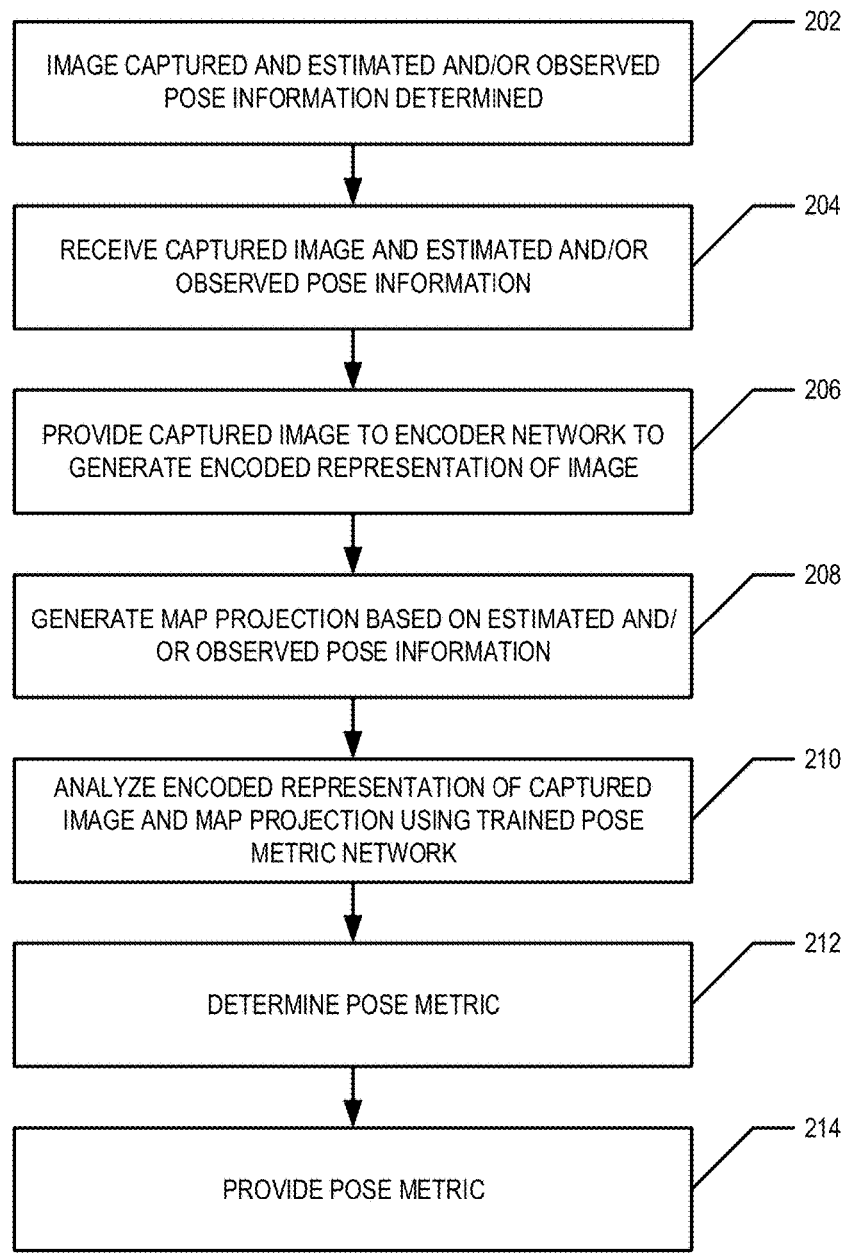

LEARNING A SIMILARITY MEASURE FOR VISION-BASED LOCALIZATION ON A HIGH DEFINITION (HD) MAP

TECHNOLOGICAL FIELD

An example embodiment relates generally to localization. In particular, an example embodiment generally relates to training a network to determine a similarity measure for image-based localization on a map, for example, for enabling autonomous and/or assisted driving.

BACKGROUND

Autonomous driving requires high accuracy, real-time localization of vehicles. Currently, most vehicle navigation has been accomplished using a global positioning system (GPS), which provides a real-time location with a 95% confidence interval of 7.8 meters, according to the US government. However, in complicated urban environments, reflection in GPS signals can further increase this error, such that a determined location may be off by as much as 30 meters. Given that the width of many lanes is only 3 to 4 meters, this accuracy is not sufficient to properly localize an autonomous vehicle so that it can make safe route planning decisions. Other sensors, such as inertial measurement units (IMUs) can increase the accuracy of localization by taking into account vehicle movement, but these sensors tend to drift and still do not provide sufficient accuracy for localization.

Generally, image-based vehicle localization uses feature-matching using, for example, GPS data to determine a possible vehicle location on a map. The map provides a set of stable features to which features present in an image may be matched. For example, features in the image may be matched to features in the map over different locations on the map to perform an accurate localization of the vehicle. However, these feature matching techniques generally fail to provide a metric indicating how well an image feature matches a map feature (i.e., to quantify a feature error in terms of a pose error).

BRIEF SUMMARY

Example embodiments, provide methods, apparatus, computer programs products, and systems for determining a pose metric describing the similarity between a captured image and a map projection. At least some example embodiments allow for an accurate, real time (or near real time) determination of a similarity metric between features in a captured image and features of a map. In an example embodiment, a pose metric may be determined by a pose metric network. The pose metric describes the similarity (or dissimilarity) between the captured image and the map projection. For example, the pose metric may describe the similarity (or dissimilarity) between one or more image features present in the captured image and one or more corresponding map features present in the map projection. In an example embodiment, the pose metric network is a deep net and/or neural network. The pose metric network is trained using one or more instances of training information/data. In an example embodiment, an instance of training information/data may comprise one or more of a known image, an encoded representation of the known image, correct pose information/data corresponding to the known image, incorrect pose information/data generated based on the correct pose information/data, a correct map projection generated based on the correct pose information/data, and an incorrect map projection generated based on the incorrect pose information/data. In an example embodiment, pose information/data comprises a location (e.g., latitude and longitude) and a heading. In an example embodiment, correct pose information/data may comprise a correct location and direction and/or heading from which the known image was captured and the incorrect pose information/data may comprise a location and direction and/or heading that is similar to location and direction/heading of the correct pose information/data but which is known to be incorrect. In an example embodiment, the pose metric may be used to indicate the accuracy of localization of a vehicle based on one or more location sensors on board the vehicle. Thus, in an example embodiment, the pose metric may be used in real time or near real time to determine one or more operational parameters that improve the functioning of a vehicle apparatus and/or a remote apparatus.

In an example embodiment, a captured image and corresponding observed pose data are captured or received. The captured image is captured by an image capturing device onboard a vehicle. The observed pose data is determined by a location sensor onboard the vehicle. The observed pose data indicate the pose of the vehicle when the image was captured. A map projection is generated based on map data and the observed pose data. The captured image and the map projection are analyzed by a pose metric network. The pose metric network determines a pose metric based on the analysis of the captured image and the map projection. The pose metric describes how similar the captured image is to the map projection.

In an example embodiment, a routing and navigation system is provided. In an example embodiment, the routing and navigation system comprises an image capturing device configured to capture a captured image; a location sensor configured to determine observed pose data that indicates the pose of the routing and navigation system when the captured image was captured; memory storing map data; and at least one processor. The at least one processor is configured to generate a map projection based on the map data and the observed pose data and execute a pose metric network. The pose metric network may be executed to analyze the captured image and the map projection; and determine, based on the analysis of the captured image and the map projection, a pose metric. The pose metric describes how similar the captured image is to the map projection. The at least one processor may be further configured to determine one or more operational parameters based on the pose metric, the one or more operational parameters configured to control at least one aspect of the operation of the routing and navigation system.

In an example embodiment, the pose metric describes how similar one or more image features within the captured image are to one or more corresponding map features within the map projection. In an example embodiment, the at least one processor is further configured to generate an encoded representation of the captured image. In an example embodiment, analyzing the captured image and the map projection comprises analyzing the encoded representation of the captured image and the map projection. In an example embodiment, the at least one processor is further configured to generate an inverse perspective map of the captured image and wherein (a) the map projection is an inverse perspective map map projection and (b) analyzing the captured image and the map projection comprises analyzing the inverse perspective map of the captured image and the map projection. In an example embodiment, the at least one processor is further configured to generate an encoded representation of the inverse perspective map of the captured image and wherein analyzing the captured image and the map projection comprises analyzing the encoded representation of the inverse perspective map of the captured image and the map projection. In an example embodiment, the map data is accessed from a high definition (HD) map.

In an example embodiment, the pose metric network is a trained neural network. In an example embodiment, training of the neural network comprises generating one or more instances of training data. An instance of training data comprises (a) an encoded representation of an image, (b) correct pose data corresponding to the image, (c) incorrect pose data generated by modifying the correct pose data, (d) a correct map projection generated based on the correct pose data and the map data, and (e) an incorrect map projection generated based on the incorrect pose data and the map data. In an example embodiment, training the neural network further comprises performing a first analysis, comprising analyzing a similarity between the correct map projection and the encoded representation of the image; determining the value of a correct loss function based on the first analysis; performing a second analysis, comprising analyzing a similarity between the incorrect map projection and the encoded representation of the image; determining the value of an incorrect loss function based on the second analysis; and updating one or more network weights based at least in part on at least one of (a) the value of the correct loss function, (b) the value of the incorrect loss function, or (c) both the value of the correct loss function and the value of the incorrect loss function. In an example embodiment, a Siamese-encoder-decoder representation of the neural network is used to train the pose metric network. In an example embodiment, determining the value of the correct loss function comprises determining a pair-wise perpendicular distance between a first image feature present in the encoded representation of the image and a corresponding correct map feature present in the correct map projection, and determining the value of the incorrect loss function comprises determining a pair-wise perpendicular distance between the first image feature present in the encoded representation of the image and a corresponding incorrect map feature present in the incorrect map projection.

In an example embodiment, a method is provided. The method comprises capturing or receiving a captured image and corresponding observed pose data. The captured image is captured by an image capturing device onboard a vehicle. The observed pose data is determined by a location sensor onboard the vehicle. The observed pose data indicates the pose of the vehicle at when the image was captured. The method may further comprise generating, by at least one processor, a map projection based on map data and the observed pose data; analyzing the captured image and the map projection using a pose metric network; and determining, by the pose metric network and based on the analysis of the captured image and the map projection, a pose metric. The pose metric describes how similar the captured image is to the map projection.

In an example embodiment, the pose metric describes how similar one or more image features within the captured image are to one or more corresponding map features within the map projection. In an example embodiment, the method further comprises generating an encoded representation of the captured image. In an example embodiment, analyzing the captured image and the map projection comprises analyzing the encoded representation of the captured image and the map projection. In an example embodiment, the method further comprises generating an inverse perspective map of the captured image and wherein (a) the map projection is an inverse perspective map map projection and (b) analyzing the captured image and the map projection comprises analyzing the inverse perspective map of the captured image and the map projection. In an example embodiment, the method further comprises generating an encoded representation of the inverse perspective map of the captured image and wherein analyzing the captured image and the map projection comprises analyzing the encoded representation of the inverse perspective map of the captured image and the map projection. In an example embodiment, the method further comprises determining, by at least one processor, one or more operational parameters based on the pose metric, the one or more operational parameters configured to control at least one aspect of the operation of a routing and navigation system. In an example embodiment, the map data is accessed from a high definition (HD) map.

In an example embodiment, the pose metric network is a trained neural network. In an example embodiment, training of the neural network comprises generating one or more instances of training data. An instance of training data comprises (a) an encoded representation of an image, (b) correct pose data corresponding to the image, (c) incorrect pose data generated by modifying the correct pose data, (d) a correct map projection generated based on the correct pose data and the map data, and (e) an incorrect map projection generated based on the incorrect pose data and the map data. In an example embodiment, training the neural network further comprises performing a first analysis, comprising analyzing a similarity between the correct map projection and the encoded representation of the image; determining the value of a correct loss function based on the first analysis; performing a second analysis, comprising analyzing a similarity between the incorrect map projection and the encoded representation of the image; determining the value of an incorrect loss function based on the second analysis; and updating one or more network weights based at least in part on at least one of (a) the value of the correct loss function, (b) the value of the incorrect loss function, or (c) both the value of the correct loss function and the value of the incorrect loss function. In an example embodiment, a Siamese-encoder-decoder representation of the neural network is used to train the pose metric network. In an example embodiment, determining the value of the correct loss function comprises determining a pair-wise perpendicular distance between a first image feature present in the encoded representation of the image and a corresponding correct map feature present in the correct map projection, and determining the value of the incorrect loss function comprises determining a pair-wise perpendicular distance between the first image feature present in the encoded representation of the image and a corresponding incorrect map feature present in the incorrect map projection.

In accordance with an example embodiment, an apparatus is provided that comprises at least one processor, at least one memory storing computer program code, and a pose error network, with the at least one memory and the computer program code configured to, with the processor, cause the apparatus to at least capture or receive a captured image and corresponding observed pose data. The captured image is captured by an image capturing device onboard a vehicle. The observed pose data is determined by a location sensor onboard the vehicle. The observed pose data indicates the pose of the vehicle at when the image was captured. The at least one memory and the computer program code are further configured to, with the processor, cause the apparatus to at least generate a map projection based on map data and the observed pose data; analyze the captured image and the map projection using a pose metric network; and determine, by the pose metric network and based on the analysis of the captured image and the map projection, a pose metric. The pose metric describes how similar the captured image is to the map projection.

In an example embodiment, the pose metric describes how similar one or more image features within the captured image are to one or more corresponding map features within the map projection. In an example embodiment, the at least one memory and the computer program code are further configured to, with the processor, cause the apparatus to at least generate an encoded representation of the captured image. In an example embodiment, analyzing the captured image and the map projection comprises analyzing the encoded representation of the captured image and the map projection. In an example embodiment, the at least one memory and the computer program code are further configured to, with the processor, cause the apparatus to at least generate an inverse perspective map of the captured image and wherein (a) the map projection is an inverse perspective map map projection and (b) analyzing the captured image and the map projection comprises analyzing the inverse perspective map of the captured image and the map projection. In an example embodiment, the at least one memory and the computer program code are further configured to, with the processor, cause the apparatus to at least generate an encoded representation of the inverse perspective map of the captured image and wherein analyzing the captured image and the map projection comprises analyzing the encoded representation of the inverse perspective map of the captured image and the map projection. In an example embodiment, the at least one memory and the computer program code are further configured to, with the processor, cause the apparatus to at least determine one or more operational parameters based on the pose metric, the one or more operational parameters configured to control at least one aspect of the operation of the apparatus or another apparatus. In an example embodiment, the map data is accessed from a high definition (HD) map.

In an example embodiment, the pose metric network is a trained neural network. In an example embodiment, training of the neural network comprises generating one or more instances of training data. An instance of training data comprises (a) an encoded representation of an image, (b) correct pose data corresponding to the image, (c) incorrect pose data generated by modifying the correct pose data, (d) a correct map projection generated based on the correct pose data and the map data, and (e) an incorrect map projection generated based on the incorrect pose data and the map data. In an example embodiment, training the neural network further comprises performing a first analysis, comprising analyzing a similarity between the correct map projection and the encoded representation of the image; determining the value of a correct loss function based on the first analysis; performing a second analysis, comprising analyzing a similarity between the incorrect map projection and the encoded representation of the image; determining the value of an incorrect loss function based on the second analysis; and updating one or more network weights based at least in part on at least one of (a) the value of the correct loss function, (b) the value of the incorrect loss function, or (c) both the value of the correct loss function and the value of the incorrect loss function. In an example embodiment, a Siamese-encoder-decoder representation of the neural network is used to train the pose metric network. In an example embodiment, determining the value of the correct loss function comprises determining a pair-wise perpendicular distance between a first image feature present in the encoded representation of the image and a corresponding correct map feature present in the correct map projection, and determining the value of the incorrect loss function comprises determining a pair-wise perpendicular distance between the first image feature present in the encoded representation of the image and a corresponding incorrect map feature present in the incorrect map projection.

In accordance with an example embodiment, a computer program product is provided that comprises at least one non-transitory computer-readable storage medium having computer-executable program code instructions stored therein with the computer-executable program code instructions comprising program code instructions configured to capture or receive a captured image and corresponding observed pose data. The captured image is captured by an image capturing device onboard a vehicle. The observed pose data is determined by a location sensor onboard the vehicle. The observed pose data indicates the pose of the vehicle at when the image was captured. The computer-executable program code instructions further comprise program code instructions configured to generate a map projection based on map data and the observed pose data; analyze the captured image and the map projection using a pose metric network; and determine, by the pose metric network and based on the analysis of the captured image and the map projection, a pose metric. The pose metric describes how similar the captured image is to the map projection.

In an example embodiment, the pose metric describes how similar one or more image features within the captured image are to one or more corresponding map features within the map projection. In an example embodiment, the computer-executable program code instructions further comprise program code instructions configured to generate an encoded representation of the captured image. In an example embodiment, analyzing the captured image and the map projection comprises analyzing the encoded representation of the captured image and the map projection. In an example embodiment, the computer-executable program code instructions further comprise program code instructions configured to generate an inverse perspective map of the captured image and wherein (a) the map projection is an inverse perspective map map projection and (b) analyzing the captured image and the map projection comprises analyzing the inverse perspective map of the captured image and the map projection. In an example embodiment, the computer-executable program code instructions further comprise program code instructions configured to generate an encoded representation of the inverse perspective map of the captured image and wherein analyzing the captured image and the map projection comprises analyzing the encoded representation of the inverse perspective map of the captured image and the map projection. In an example embodiment, the computer-executable program code instructions further comprise program code instructions configured to determine one or more operational parameters based on the pose metric, the one or more operational parameters configured to control at least one aspect of the operation of the apparatus executing the computer-executable program code or another apparatus. In an example embodiment, the map data is accessed from a high definition (HD) map.

In an example embodiment, the pose metric network is a trained neural network. In an example embodiment, training of the neural network comprises generating one or more instances of training data. An instance of training data comprises (a) an encoded representation of an image, (b) correct pose data corresponding to the image, (c) incorrect pose data generated by modifying the correct pose data, (d) a correct map projection generated based on the correct pose data and the map data, and (e) an incorrect map projection generated based on the incorrect pose data and the map data. In an example embodiment, training the neural network further comprises performing a first analysis, comprising analyzing a similarity between the correct map projection and the encoded representation of the image; determining the value of a correct loss function based on the first analysis; performing a second analysis, comprising analyzing a similarity between the incorrect map projection and the encoded representation of the image; determining the value of an incorrect loss function based on the second analysis; and updating one or more network weights based at least in part on at least one of (a) the value of the correct loss function, (b) the value of the incorrect loss function, or (c) both the value of the correct loss function and the value of the incorrect loss function. In an example embodiment, a Siamese-encoder-decoder representation of the neural network is used to train the pose metric network. In an example embodiment, determining the value of the correct loss function comprises determining a pair-wise perpendicular distance between a first image feature present in the encoded representation of the image and a corresponding correct map feature present in the correct map projection, and determining the value of the incorrect loss function comprises determining a pair-wise perpendicular distance between the first image feature present in the encoded representation of the image and a corresponding incorrect map feature present in the incorrect map projection.

In accordance with yet another example embodiment of the present invention, an apparatus is provided that comprises means for capturing or receiving a captured image and corresponding observed pose data. The captured image is captured by an image capturing device onboard a vehicle. The observed pose data is determined by a location sensor onboard the vehicle. The observed pose data indicates the pose of the vehicle at when the image was captured. In certain embodiments, the apparatus comprises means for generating a map projection based on map data and the observed pose data. The apparatus further comprises means for analyzing the captured image and the map projection using a pose metric network. The apparatus further comprises means for determining, by the pose metric network and based on the analysis of the captured image and the map projection, a pose metric. The pose metric describes how similar the captured image is to the map projection.

BRIEF DESCRIPTION OF THE DRAWINGS

Figure 1:
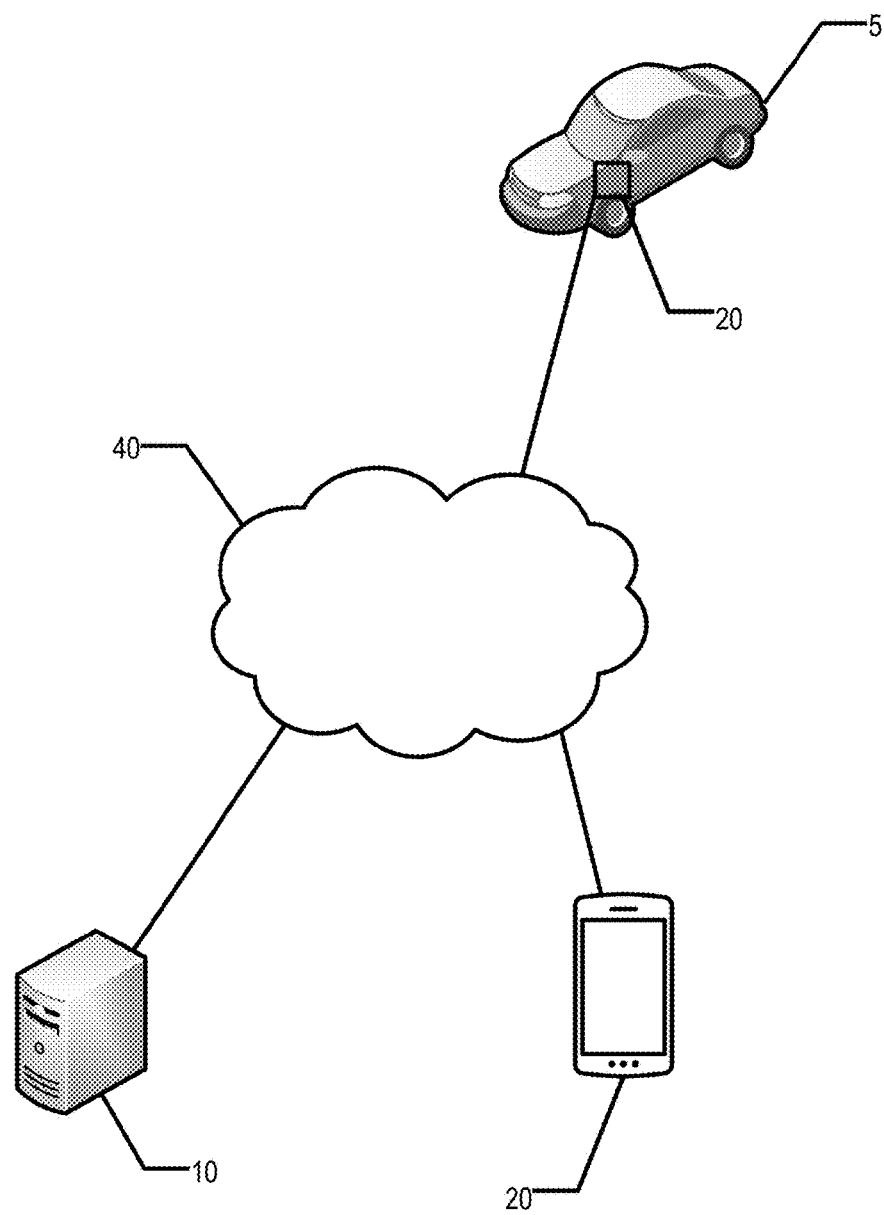
Figure 2A:
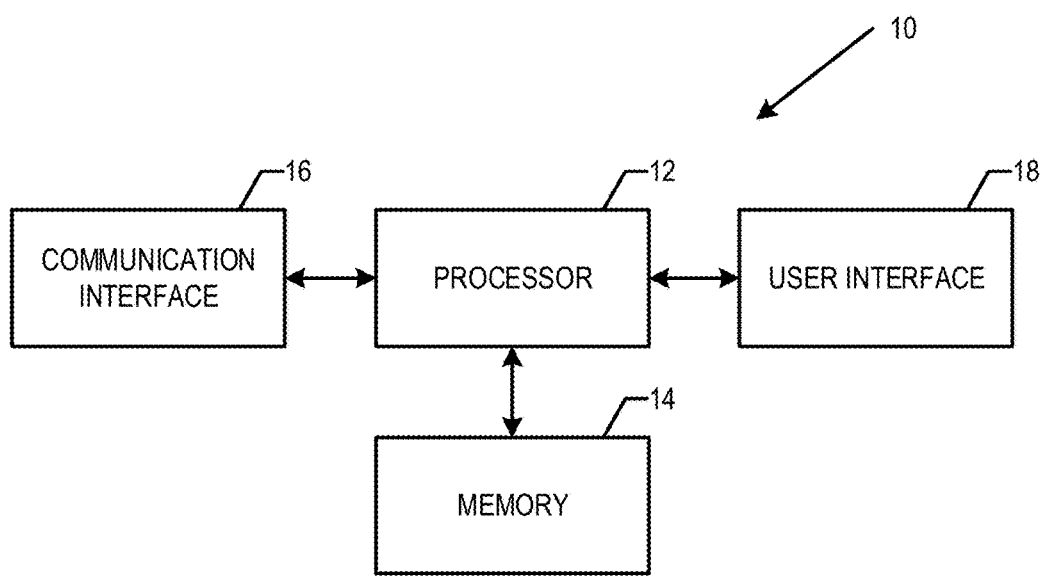
Figure 2B:
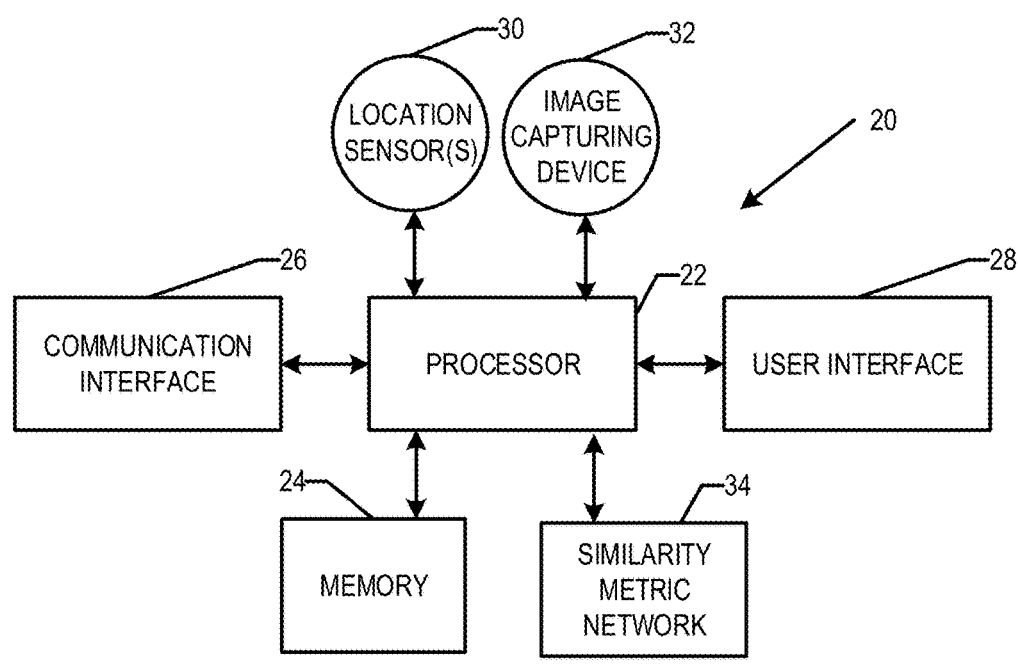
Figure 4:
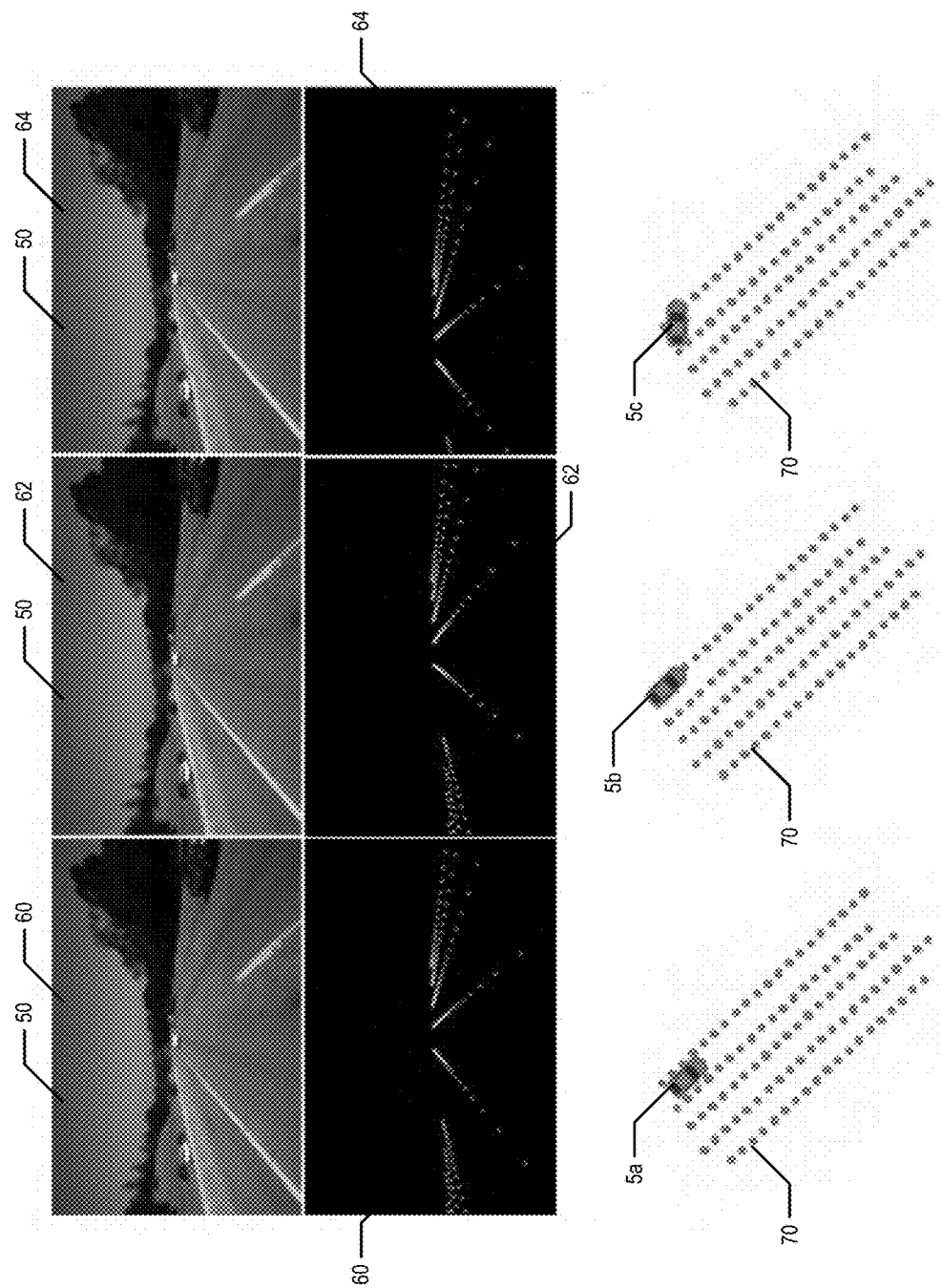
Figure 5:
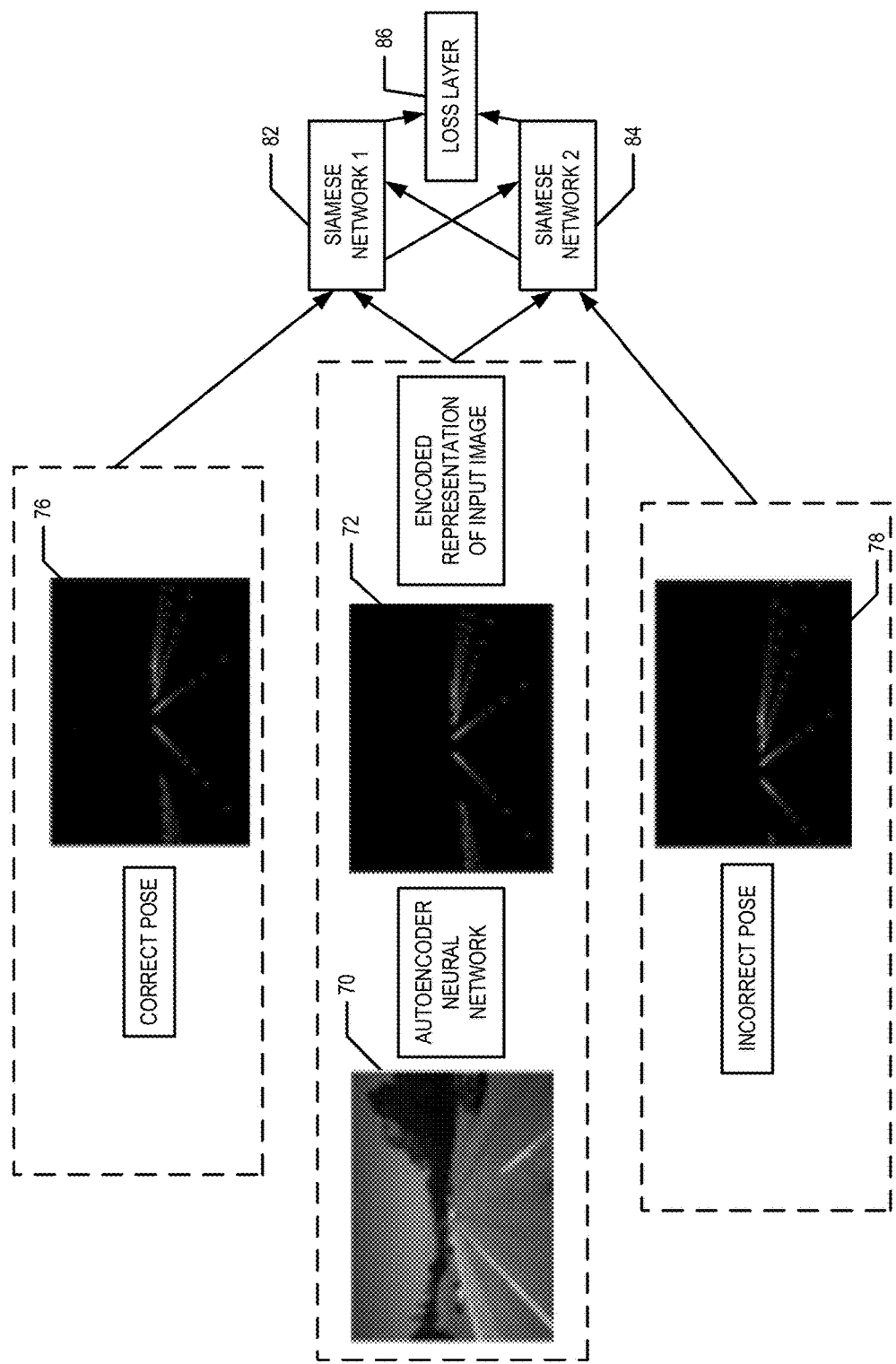

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a remote apparatus that may be specifically configured in accordance with an example embodiment;

FIG. 2B is a block diagram of a vehicle apparatus that may be specifically configured in accordance with an example embodiment;

FIG. 3 is a flowchart illustrating operations performed, such as by the apparatus of FIG. 2A or the vehicle apparatus of FIG. 2B to train the pose metric network, in accordance with an example embodiment;

FIG. 4 illustrates an example image and corresponding correct and incorrect map projections, in accordance with an example embodiment;

FIG. 5 illustrates an example similarity metric network training architecture, according to an example embodiment; and FIG. 6 is a flowchart illustrating operations performed, such as by the remote apparatus of FIG. 2A or the vehicle apparatus of FIG. 2B, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

I. General Overview

Methods, apparatus and computer program products are provided in accordance with an example embodiment in order to provide a pose metric. In various embodiments, a pose metric is configured to indicate how similar the estimated pose of an entity is to the actual pose of the entity. For example, a pose metric indicates how similar an estimated and/or observed pose of a vehicle is to the actual pose of the vehicle. In an example embodiment, the pose of a vehicle may be the location (e.g., a physical geo-location of the vehicle) and a heading (e.g., the direction in which the vehicle is facing). For example, the estimated and/or observed pose may be a location and/or heading of a vehicle that is determined by a Global Navigation Satellite System (GNSS) sensor, Global Positioning System (GPS) sensor, inertial measurement unit(s) (IMU), other position determining systems, and/or a combination thereof. The actual pose may be a true pose of the vehicle. For example, the similarity between the estimated and/or observed pose of a vehicle and the actual pose may be determined by comparing an image captured by an image capturing device onboard the vehicle to a map projection according to the estimated and/or observed pose.

In an example embodiment, the map may be a high definition (HD) and/or other sparse map. For example, the map may provide a sparse representation of the environment. For example, the map may only include static features that change little over a period of time. For example, in an example embodiment, the map may comprise geographically tagged lane line markers, road signs, building facades, and/or the like. In one embodiment, the map may be a dense representation of the environment, such as a dense LiDAR-based map. In particular, the map information/data comprises one or more static features that are linked, tagged, and/or the like with a ground truth actual pose corresponding to the static feature.

In an example embodiment, captured image may be compared to the map projection by a trained deep-net or neural network. For example, a deep-net or neural network may be trained to implicitly compare a captured image and/or an encoded representation thereof with a map projection to determine the similarity between the captured image and the projection. In an example embodiment, the deep-net or neural network may be trained by providing the deep-net or neural network with a correct map projection, an incorrect map projection, and the captured image (and/or an overhead projection thereof and/or an encoded representation thereof).

The pose metric described herein provides a powerful tool for determining how similar an estimated and/or observed pose is to an actual pose of an entity, such as a vehicle. Thus, the pose metric allows for a computing entity (e.g., an autonomously driving vehicle, and/or the like) to determine if the localization of the vehicle based on, for example, GPS information/data is insufficient for autonomous driving for use in updating map information/data, and/or the like. For example, embodiments of the present invention provide for improving computer technology by providing a metric that may be used to inform an automated analysis to provide improved mapping of features and efficiency of use of localization resources for an automated vehicle, for example.

FIG. 1 provides an illustration of an example system that can be used in conjunction with various embodiments of the present invention. As shown in FIG. 1, the system may include one or more vehicle apparatuses 20, one or more remote apparatuses 10, one or more networks 40, and/or the like. In various embodiments, the vehicle apparatus 20 may be an in vehicle navigation system, vehicle control system, a mobile computing device, and/or the like. For example, a vehicle apparatus 20 may be an in vehicle routing and navigation system mounted within and/or be onboard a vehicle 5 such as a motor vehicle, non-motor vehicle, automobile, car, scooter, truck, van, bus, motorcycle, bicycle, Segway, golf cart, and/or the like. In various embodiments, the vehicle apparatus 20 may be a smartphone, tablet, personal digital assistant (PDA), and/or other mobile computing device. In another example, the vehicle apparatus 20 may be a vehicle control system configured to autonomously drive a vehicle 5, assist in control of a vehicle 5, and/or the like.

In an example embodiment, a remote apparatus 10 may comprise components similar to those shown in the example remote apparatus 10 diagrammed in FIG. 2A. In an example embodiment, the remote apparatus 10 may be configured to train and/or utilize a post metric network. In an example embodiment, the remote apparatus 10 is configured to provide map updates, one or more pose metrics, and/or the like to the vehicle apparatus 20. In an example embodiment, a vehicle apparatus 20 may comprise components similar to those shown in the example vehicle apparatus 20 diagrammed in FIG. 2B. In various embodiments, the remote apparatus 10 may be located remotely from the vehicle apparatus 20. Each of the components of the system may be in electronic communication with, for example, one another over the same or different wireless or wired networks 40 including, for example, a wired or wireless Personal Area Network (PAN), Local Area Network (LAN), Metropolitan Area Network (MAN), Wide Area Network (WAN), cellular network, and/or the like. In some embodiments, a network 40 may comprise the automotive cloud, digital transportation infrastructure (DTI), radio data system (RDS)/high definition (HD) radio or other digital radio system, and/or the like. For example, a vehicle apparatus 20 may be in communication with a remote apparatus 10 via the network 40. For example, the vehicle apparatus 20 may communicate with the remote apparatus 10 via a network, such as the Cloud. For example, the Cloud may be a computer network that provides shared computer processing resources and data to computers and other devices connected thereto. For example, the vehicle apparatus 20 may be configured to receive one or more map tiles of a digital map from the remote apparatus 10.

In an example embodiment, as shown in FIG. 2B, the vehicle apparatus 20 may comprise a processor 22, memory 24, a communications interface 26, a user interface 28, one or more location sensors 30 (e.g., a location sensor such as a GPS sensor; IMU sensors, and/or the like), one or more image capturing devices (e.g., camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras, 3D cameras, 360° cameras and/or the like) and/or other sensors that enable the vehicle apparatus 20 to determine one or more features of the corresponding vehicle's 5 surroundings, and/or other components configured to perform various operations, procedures, functions or the like described herein. In at least some example embodiments, the memory 24 is non-transitory and may store information/data corresponding to one or more parameters, features, and/or characteristics of the image capturing device 32. The memory 24 may further store information/data that identifies the correspondence between (a) the position of the vehicle 5 and the position of the location sensor 30, (b) the position of the location sensor 30 and the image capturing device 32, (c) the pose of the vehicle 5 and the field of view of the image capturing device 32, and/or the like. In an example embodiment, the vehicle apparatus may further comprise a pose metric network 34 that has been trained to determine a pose metric that indicates the similarity between an estimated and/or observed pose of the vehicle 5 (e.g., as determined by a location sensor 30) and the actual pose of the vehicle 5. For example, the pose metric network 34 may be trained to compare an image captured by the image capturing device 32 to a map projection that is generated based on the estimated and/or proposed pose of the vehicle 5 (e.g., determined by the location sensor(s) 30) determine the similarity between the captured image the map projection. The similarity between the captured image and the map projection is indicative of the similarity between the estimated and/or observed pose and the actual pose of the vehicle 5. In an example embodiment, the pose error network 34 may operate on a central processing unit (CPU) or a graphics processing unit (GPU) of the vehicle apparatus 20.

Similarly, as shown in FIG. 2A, the remote apparatus 10 may comprise a processor 12, memory 14, a user interface 18, a communications interface 16, and/or other components configured to perform various operations, procedures, functions or the like described herein. Certain example embodiments of the vehicle apparatus 20 and the remote apparatus 10 are described in more detail below with respect to FIGS. 2A and 2B.

II. Example Operation

In at least some example embodiments, an implicit comparison of a captured image (and/or a projection and/or encoded representation thereof) and a binary two dimensional projection generated based on map information/data and the estimated and/or observed pose corresponding to the captured image by a trained deep-net/neural network is used to determine a pose metric corresponding to the similarity between the estimated and/or observed pose and the actual pose corresponding to the captured image. For example, one or more location sensors 30 of the vehicle apparatus 20 may be used to determine an estimated and/or observed pose of a vehicle 5 and/or vehicle apparatus 20. In an example embodiment, the estimated and/or observed pose may comprise geospatial coordinates (e.g., latitude and longitude, and/or the like) and/or a heading that are expected to represent the current physical location and orientation of the vehicle 5 and/or the vehicle apparatus 20 on board the vehicle 5. In an example embodiment, the estimated and/or observed pose may comprise a heading that is described by an angle indicating an estimated and/or observed direction the vehicle 5 with respect to a reference direction. For example, the estimated and/or observed heading may comprise the expected and/or observed angle between a reference direction (e.g., North and/or the like) and the direction in which the front of the vehicle 5 is directed.

Before, after, and/or simultaneous to determining the estimated and/or observed pose of the vehicle 5 and/or the vehicle apparatus 20, an image capturing device 32 of the vehicle apparatus 20 may capture one or more images. The pose metric network 34 may compare the captured image, an encoded representation of the captured image, an inverse perspective map (IPM) of the captured image, and/or an encoded representation of the IPM of the captured image to a corresponding map projection generated based on the estimated and/or observed pose.

Based on the comparison of the captured image, an encoded representation of the captured image, an inverse perspective map (IPM) of the captured image, and/or an encoded representation of the IPM of the captured image to a corresponding map projection, a pose metric describing the similarity of the compared image(s), encoded representation(s), and/or projection(s) may be determined. The pose metric may be configured to describe the similarity between the estimated and/or observed pose and the actual pose of the vehicle 5 when the estimated and/or observed pose was determined and/or the captured image was captured. Therefore, a pose metric describing the amount of error in an estimated and/or observed pose may be determined without requiring explicit detection of features within the captured image. Thus, a pose metric may be efficiently determined in real time or near real time that may be used by one or more logical functions of the remote apparatus 10 and/or the vehicle apparatus 20 to determine if the estimated and/or observed pose of the vehicle 5 and/or vehicle apparatus 20 is similar enough to the actual pose of the vehicle 5 and/or vehicle apparatus 20 to enable autonomous driving of the vehicle 5, if additional localization resources are required for autonomous driving, if the pose information/data corresponding to information/data captured by the one or more sensors of the vehicle apparatus 20 is of sufficient quality for utilizing the information/data in a map information/data update analysis, and/or the like. Moreover, while described in conjunction with real time or near real time application, some example embodiments may be implemented in other scenarios.

In an example embodiment, the captured image may be provided to an autoencoder network to generate an encoded representation of the captured image. For example, the autoencoder network may be a lane line detector, traffic sign detector, building facade detector, generic static feature detector, and/or the like used to extract feature information/data from the captured image to generate an encoded representation of the captured image. For example, FIG. 5 shows an example encoded representation 72 of an example captured image 70. In an example embodiment, a bird's eye view, top down view, and/or IPM (referred to as an IPM herein) of the captured image may be generated. For example, the captured image may be synthetically warped, transformed and/or the like to generate a bird's eye view, top down view, or IPM of the captured image. For example, a homography may be used to map pixels from the captured image into a bird's eye view, top down view, or IPM of the captured image. In an example embodiment, an encoded representation of the bird's eye view, top down view, and/or IPM may also be generated.

Map information/data may be accessed and a two dimensional projection thereof may be generated based on the estimated and/or observed pose by the remote apparatus 10 and/or the vehicle apparatus 20. For example, map projection may be a binary map and/or the like generated based on reference static feature information/data corresponding to one or more ground truth features located near the estimated and/or observed pose, as indicated by the map information/data. For example, the map information/data projection may provide an expected view of one or more reference static features from the estimated and/or observed pose. In an example embodiment, an IPM map projection may be generated.

Training the Pose Metric Network

In an example embodiment, the remote apparatus may train a deep-net and/or neural network to act as pose metric network. In an example embodiment, the remote apparatus 10 may train a pose metric network and the weights and/or parameters of the trained pose error network may be provided to the pose metric network 34 of the vehicle apparatus 20. In an example embodiment, the remote apparatus 10 may generate one or more sets of training images that may be used to train a deep-net and/or neural network to provide the pose metric network. In an example embodiment, training the pose metric network comprises determining one or more network weights and/or parameters through an iterative network training process.

In an example embodiment, the one or more instances of training information/data may be generated before the training of the deep-net and/or neural network. In an example embodiment, one or more instances of training information/data may be generated after the training of the deep-net and/or neural network has begun. In an example embodiment, the one or more instances of training information/data may be bundled into sets of instances of training information/data. The deep-net and/or neural network may process the each instance of training information/data in the set of training information/data, update the network weights and/or parameters, and then process the same and/or a different set of training information/data. Thus, the training of the deep-net and/or neural network may not require the processing of each of the instances of training information/data to update the network weights and/or parameters. Moreover, multiple rounds of training over different sets of training information/data may provide for a more robust training of the pose metric network. In one example embodiment, each of instances of training information/data of the one or more sets of training information/data may be processed during each iteration of updating the network weights and/or parameters.

In an example embodiment, an instance of training information/data may comprise a known image and correct pose information/data corresponding to the known image. For example, the correct pose information/data may be a ground truth pose corresponding to the known image. In an example embodiment, an instance of training information/data may comprise an encoded representation of the known image, an IPM of the known image, and/or an encoded representation of the IPM of the known image. In an example embodiment, an instance of training information/data may comprise a correct map projection, wherein the correct map projection is a map information/data generated based on the correct pose information/data corresponding to the known image. In an example embodiment, an instance of training information/data may comprise one or more instances of incorrect and/or modified pose information/data. In an example embodiment, an instance of incorrect and/or modified pose information/data is an instance of pose information/data into which a known perturbation and/or error has been introduced. For example, to generate an instance of incorrect and/or modified pose information/data the geographical location of the correct pose information/data may be modified by an amount (e.g., a few centimeters to several meters) and/or the heading of the correct pose information may be modified an amount (e.g., a couple degrees to tens of degrees). In an example embodiment, an instance of training information/data may comprise one or more incorrect map projections. For example, an incorrect map projection may be a map projection generated based on an instance of modified pose information/data. In an example embodiment, an instance of training information/data may comprise a correct IPM map projection and/or one or more incorrect IPM map projections. For example, a correct IPM map projection may be a map projection corresponding to an IPM perspective and generated using the pose information/data and an incorrect IPM map projection may be a map projection corresponding to an IPM perspective and generated using an instance of incorrect and/or modified pose information/data.

FIG. 3 provides a flowchart illustrating a process of training the pose metric network 34. Starting at block 102, one or more known images and the corresponding correct pose information/data are accessed and/or received. A known image is an image having known correct pose information/data indicating the pose from which the image associated therewith was captured. For example, the correct pose information/data may comprise a ground truth pose for the known image. In an example embodiment, one or more known images may be captured by an image capturing device 32 of a vehicle apparatus 20 and the ground truth pose of the image may be determined. For example, the apparatus 10 may receive and/or access one or more known images and the correct corresponding pose information/data. For example, the apparatus 10 may comprise means, such as processor 12, memory 14, communications interface 16, and/or the like, for receiving and/or accessing known images and the correct corresponding pose information/data.

At block 104, one or more instances of incorrect and/or modified pose information/data are generated based on instances of correct pose information/data. For example, the remote apparatus 10 may generate one or more instances of incorrect and/or modified pose information/data. For example, the remote apparatus 10 may comprise means, such as the processor 12 and/or the like, for generating one or more instances of incorrect and/or modified pose information/data. For example, a perturbation, error, modification, and/or the like may be introduced, added to, and/or the like one or more instances of correct pose information/data corresponding to a first known image to generate an instance of incorrect and/or modified pose information/data corresponding to the first known image. For example, the correct pose information/data corresponding to a first known image may be modified so that the position indicated in the incorrect and/or modified pose information/data is a one meter distance, for example, from the position indicated in the correct pose information/data and/or the heading indicated in the incorrect and/or modified pose information/data is twelve degrees, for example, off from the heading indicated in the correct pose information/data. In an example embodiment, the perturbations, errors, and/or modifications used to amend the correct pose information/data used to generate the incorrect and/or modified pose information/data may be randomly selected from a distribution of perturbations, errors, and/or modifications. For example, a position perturbation, error, and/or modification may be selected from a distribution of possible perturbations, errors, and/or modifications ranging from a few centimeters to several meters. In another example, a heading perturbation, error, and/or modification may be selected from a distribution of possible perturbations, errors, and/or modifications ranging from a couple degrees to tens of degrees. In an example embodiment, an instance of incorrect and/or modified pose information/data may include either a position perturbation, error, and/or modification or a heading perturbation, error, and/or modification with respect to the corresponding correct pose information/data. In an example embodiment, an instance of incorrect and/or modified pose information/data includes both a position perturbation, error, and/or modification and a heading perturbation, error, and/or modification with respect to the corresponding correct pose information/data. In an example embodiment, an instance of incorrect and/or modified pose information/data may include a position perturbation, error, and/or modification, a heading perturbation, error, and/or modification, or both, with respect to the corresponding correct pose information/data. Thus, one or more instances of incorrect and/or modified pose information/data may be generated, wherein each instance of incorrect and/or modified pose information/data corresponds to one of the one or more known images.

At block 106, a correct map projection is generated based on the correct pose information/data comprising the known pose for one of the one or more known images. For example, the remote apparatus 10 may generate a correct map projection based on the correct pose information/data. For example, the remote apparatus 10 may comprise means, such as the processor 12, communications interface 16, and/or the like, for generating a correct map projection corresponding to a known image based on the correct pose information/data. For example, the map information/data may be accessed and the correct pose information/data may be used to determine, identify, and/or the like one or more features of the map information/data that are expected to be present in the known image based on the correct pose information/data. The map information/data corresponding to the determined, identified, and/or the like one or more features may then be used to generate the correct map projection. For example, the correct map projection may provide an expected encoded representation of the corresponding known image based on the map information/data and the correct pose information/data. In an example embodiment, a correct IPM map projection may also be generated. A correct IPM map projection may be a correct map projection that is synthetically warped, transformed and/or the like to generate a bird's eye view, top down view, or IPM of the correct map projection. For example, a homography may be used to map pixels from the correct map projection into a bird's eye view, top down view, or IPM of the correct map projection. In another example, the correct IPM map projection may be generated directly from the map information/data as an IPM map projection rather than by transforming the correct map projection.

At block 108, an incorrect map projection is generated based on the incorrect and/or modified pose information/data comprising the incorrect and/or modified pose for one of the one or more known images. For example, the remote apparatus 10 may generate an incorrect map projection based on the incorrect and/or modified pose information/data. For example, the remote apparatus 10 may comprise means, such as the processor 12, communications interface 16, and/or the like, for generating an incorrect map projection corresponding to a known image based on the incorrect and/or modified pose information/data. For example, the map information/data may be accessed and the incorrect and/or modified pose information/data may be used to determine, identify, and/or the like one or more features of the map information/data that are expected to be present in the known image based on the incorrect and/or modified pose information/data. The map information/data corresponding to the determined, identified, and/or the like one or more features may then be used to generate the incorrect map projection. For example, the incorrect map projection may provide an expected encoded representation of the corresponding known image based on the map information/data and the incorrect and/or modified pose information/data. As the incorrect map projection is generated based on the incorrect and/or modified pose information/data, it is expected that one of more features present in the incorrect map projection may or may not be present in an encoded representation of the known image and/or may not be properly aligned and/or the like with the corresponding features in the encoded representation of the known image. In an example embodiment, an incorrect IPM map projection may also be generated. An incorrect IPM map projection may be an incorrect map projection that is synthetically warped, transformed and/or the like to generate a bird's eye view, top down view, or IPM of the incorrect map projection. For example, a homography may be used to map pixels from the incorrect map projection into a bird's eye view, top down view, or IPM of the incorrect map projection. In another example, the incorrect IPM map projection may be generated directly from the map information/data as an IPM map projection rather than by transforming the incorrect map projection.

At block 110, the known image may be provided to an autoencoder network to generate an encoded representation of the known image. For example, the known image may be provided to a lane line detector, traffic sign detector, building facade detector, generic static feature detector, and/or the like used to extract feature information/data from the known image to generate an encoded representation of the known image. For example, the remote apparatus 10 may provide the known image to an autoencoder network to generate an encoded representation of the known image. For example, the remote apparatus 10 may comprise means, such as the processor 12, communications interface 16, and/or the like, for providing the known image to an autoencoder network to generate an encoded representation of the known image. In an example embodiment, the remote apparatus 10 may comprise an autoencoder network that receives the known image and generates the encoded representation of the known image. In an example embodiment, the remote apparatus 10 may provide the known image to an autoencoder network operating on another computing entity and receive the generated encoded representation of the known image therefrom. Thus, an encoded representation of the known image may be generated.

In an example embodiment, an instance of training information/data comprises an encoded representation of a known image, correct pose information/data corresponding to the known image, one or more instances of incorrect and/or modified pose information/data generated based on the correct pose information/data, a correct map projection generated based on the correct pose information/data, and one or more incorrect map projections each generated based on an instance of incorrect and/or modified pose information/data. An instance of training information/data may further comprise an encoded representation of an IPM corresponding to the known image, a correct IPM map projection, and one or more incorrect IPM map projections. One or more instances of training information/data may be generated (e.g., for example by executing processes and procedures as described above with respect to blocks 102-110). In an example embodiment, a plurality of instances of training information/data may be bundled into sets of instances of training information/data. Each set of instances of training information/data may comprise one or more instances of training information/data. A first set of instances of training information/data may be provided to a deep-net and/or neural network for analysis and training of the deep-net and/or neural network to act as a pose metric network. One or more network weights and/or parameters may be updated based on the analysis of the first set of instances of training information/data and, if the network weights and/or parameters have not reached a particular convergence level (e.g., the convergence of the network weights and/or parameters do not satisfy a threshold requirement), a second set of instances of training information/data may be provided to the deep-net and/or neural network for analysis and further updating and/or refinement of the network weights and/or parameters. Thus, in an example embodiment, a deep-net and/or neural network may be iteratively trained to act as a pose metric network by iteratively training the deep-net and/or neural network using one or more sets of instances of training information/data. The training of the deep-net and/or neural network will now be described in more detail.

FIG. 4 provides some examples of incorrect map projections 62, 64 and a correct map projection 60 corresponding to a known image 50. For example, a correct map projection 60 provides an expected view of the lane lines 70 for the situation wherein the vehicle 5a is traveling along a road segment and maintaining a travel lane. When the correct map projection 60 is overlaid on known image 50, the lane lines shown in the correct map projection 60 generally align with the lane lines in the known image 50. Thus, the correct pose information/data used to generate the correct map projection 60 is a good description of the pose of the vehicle 5a when the known image 50 was captured. The incorrect map projection 62 was generated using incorrect and/or modified pose information/data in which a position and/or lateral error has been introduced. For example, the correct pose information/data corresponding to the known image 50 has been altered to include a translation of the position from that of the vehicle 5a to that of the vehicle 5b. Thus, when the incorrect map projection 62 is overlaid on the known image 50, the lane lines of the incorrect map projection 62 do not align with the lane lines of the known image 50. In particular, the lane lines of the incorrect map projection 62 are laterally offset from the lane lines of the known image 50. The incorrect map projection 64 was generated using incorrect and/or modified pose information/data in which a heading error has been introduced. For example, the correct pose information/data corresponding to the known image 50 has been altered to include a rotation of the position from that of the vehicle 5a to that of the vehicle 5c. Thus, when the incorrect map projection 64 is overlaid on the known image 50, the lane lines of the incorrect map projection 64 do not align with the lane lines of the known image 50. In particular, the lane lines of the incorrect map projection 64 are offset from the lane lines of the known image 50 by an angle determined by the modification angle by which the heading was modified. Thus a comparison of the goodness of fit of the correct map projection with respect to the known image (and/or an encoded representation thereof) to the goodness of fit of an incorrect map projection with respect to the known image (and/or an encoded representation thereof) provides an indication of how similar the incorrect and/or modified pose information/data is to the correct pose information/data. Similarly, the goodness of fit of the correct IPM map projection to an IPM of the known image (and/or an encoded representation thereof) may be compared to the goodness of fit of an incorrect IPM map projection to an IPM of the known image (and/or an encoded representation thereof) to determine an indication of how similar the incorrect and/or modified pose information/data is to the correct pose information/data.

Returning to FIG. 3, at block 112, at least one instance of training information/data is provided to the deep-net and/or neural network for training and the deep-net and/or neural network compares the encoded representation to the correct map projection and to the incorrect map projection. For example, the remote apparatus 10 may compare the encoded representation of the known image to the correct map projection and compare the encoded representation of the known image to the incorrect map projection. For example, the remote apparatus 10 may comprise means, such as the processor 12, and/or the like for comparing the encoded representation of the known image to the correct map projection and comparing the encoded representation of the known image to the incorrect map projection. In particular, the alignment of one or more features present in the encoded representation of the known image and corresponding map features in the correct map projection may be analyzed and the alignment of one or more features present in the encoded representation of the known image and corresponding map features in the incorrect map projection may be analyzed. The results of the two analysis may be compared to determine the degree, level, and/or amount of similarity between the alignment of one or more features present in the encoded representation of the known image and the corresponding map features in the correct map projection and the alignment of the one or more features present in the encoded representation of the known image and the corresponding map features in the incorrect map projection.

In an example embodiment, through the learning process, layers of the network learn an implicit representation of map features corresponding to features present in known images. Thus, in an example embodiment, explicit detection of the features in a captured image are not required. For example, in an example embodiment, during the training phase, a known image and/or an encoded representation of a known image may be provided to the pose metric network. However, once trained, the pose metric network may be configured to receive the captured image and an encoded representation of the captured image may not be needed to determine the pose metric for the captured image and the corresponding pose information/data.

At block 114, one or more loss functions may be determined, calculated, generated, and/or the like. For example, the remote apparatus 10 may determine, calculate, generate and/or the like one or more loss functions. For example, the remote apparatus 10 may comprise means, such as the processor 12 and/or the like, for determining, calculating, generating, and/or the like one or more loss functions. In an example embodiment, a correct loss function may be determined, calculated, and/or the like based on and/or to quantify the analysis of the alignment of one or more features present in the encoded representation of the known image and the corresponding map features in the correct map projection and an incorrect loss function may be determined calculated, and/or the like based on and/or to quantify the analysis of the alignment of one or more features present in the encoded representation of the known image and the corresponding map features in the incorrect map projection. The correct loss function and the incorrect loss function may then be compared to determine, calculate, and/or the like a numerical quantity indicating the similarity between the alignment of the one or more features present in the encoded representation of the known image and the corresponding map features in the correct map projection and the alignment of the one or more features present in the encoded representation of the known image and the corresponding map features in the incorrect map projection. In an example embodiment, one loss function is determined.

In various scenarios, the traditional cross-entropy based loss function fails to provide an effective loss function. For example, in scenarios in which the map information/data provides a sparse representation of the environment (e.g., in the case of an HD map), the cross-entropy based loss function may fail to provide an effective loss function. Therefore, while one embodiment of the present invention may employ the traditional cross-entropy based loss function, various embodiments employ a non-cross-entropy based loss function. In an example embodiment, the loss function is a pair-wise perpendicular distance loss function. For example, the pair-wise perpendicular distance loss function may be an average, sum, and/or the like of the pair-wise perpendicular distance between one or more elements of one or more features present in the encoded representation of the known image and the corresponding map features in the corresponding map projection. The smaller the pair-wise perpendicular distance between two corresponding features, the better the alignment between the two features. Thus, the smaller and/or closer to zero the pair-wise perpendicular distance loss function is, the better the alignment between an encoded representation of a known image and a corresponding map projection is. Thus, in an example embodiment, the one or more network weights and/or parameters may be updated, modified, and/or the like to minimize the correct loss function.

FIG. 5 illustrates an example network training architecture employed in an example embodiment of the present invention. In the illustrated example, a Siamese-encoder-decoder representation of the network may be used to learn the pose metric. For example, as described above, an auto-encoder network may receive a known image 70 and generate an encoded representation 72 of the known image 70. Correct pose information/data may be used to generate a correct map projection 76 and an instance of incorrect and/or modified pose information/data may be used to generate an incorrect map projection 78. The encoded representation 72, the correct map projection 76, and the incorrect map projection 78 may be provided as input to train the network. The encoded representation 72 and the correct map projection 76 may be provided to a first Siamese network 82 for analysis and the encoded representation 72 and the incorrect map projection 78 may be provided to second Siamese network 84 for analysis. The results of the analysis performed by the first and second Siamese networks 82, 84 may be used to determine one or more loss functions (e.g., pair-wise perpendicular distance loss functions, and/or the like) by the loss layer 86. In another example representation of the network, the known image (and/or an encoded representation thereof), a correct map projection, and an incorrect map projection may be provided at once to the network for training of the network. In an example embodiment, a generic VGG-style network architecture may be employed for training the pose metric network. As should be understood, various network representations may be used for training the pose metric network.

Continuing with FIG. 3, at block 116, one or more network weights and/or parameters are updated, modified, and/or the like based on the analysis of one or more instances of training information/data. For example, the remote apparatus 10 may update, modify, and/or the like one or more network weights and/or parameters based on the analysis of one or more instances of training information/data. For example, the remote apparatus 10 may comprise means, such as the processor 12, memory 14, and/or the like, for updating, modifying, and/or the like one or more network weights and/or parameters based on the analysis of the one or more instances of training information/data. For example, the one or more network weights and/or parameters may be updated to minimize one or more loss functions (e.g., correct loss functions) and/or the like. In an example embodiment, the one or more network weights and/or parameters may be update using a stochastic gradient descent technique. In an example embodiment, the one or more network weights and/or parameters may be updated using a stochastic gradient descent technique using momentum, in which previous iterations of the network weights and/or parameters are remembered and the updates, modifications, and/or the like to the network weights and/or parameters are based at least in part on at least one previous iteration of the network weights and/or parameters.

At block 120, it may be determined if the one or more network weights and/or parameters have converged sufficiently to satisfy a convergence threshold requirement. In an example, if an update, modification, and/or the like to the one or more network weights and/or parameters is sufficiently small for one or more iterations, the convergence of the network weights and/or parameters may have converged sufficiently to satisfy a convergence threshold requirement. For example, the remote apparatus 10 may determine if the convergence of the one or more network weights and/or parameters is sufficient to satisfy a convergence threshold requirement. For example, the remote apparatus 10 may comprise means, such as the processor 12 and/or the like, for determining if the convergence of the one or more network weights and/or parameters is sufficient to satisfy a convergence threshold requirement.

If, at block 120, it is determined that the convergence of the one or more network weights and/or parameters is not sufficient to satisfy the convergence threshold requirement, the process may return to blocks 102 and/or 104 to generate additional instances of training information/data and/or to block 112 to further train the pose metric network using a set of instances of training information/data, and/or to otherwise further train the pose metric network.

If, at block 120, it is determined that the convergence of the one or more network weights and/or parameters is sufficient to satisfy the convergence threshold requirement, the process may continue to block 122. At block 122, the pose metric network may be locked (e.g., the network weights and/or parameters may be fixed at their current values and not updated and/or modified further). The pose metric network may then be used to provide one or more pose metrics, as described in more detail below. In an example embodiment, the one or more network weights and/or parameters may be provided (e.g., transmitted) to one or more vehicle apparatuses 20. For example by the remote apparatus 10 (e.g., using the communications interface 16) may provide the one or more network weights and/or parameters and one or more vehicle apparatuses 20 may receive (e.g., via the communications interface 26) the one or more network weights and/or parameters. A vehicle apparatus 20 may receive and store the one or more network weights and/or parameters such that the vehicle apparatus 20 may operate pose metric network 34 (e.g., via the processor 22 and/or the like). For example, the pose metric network 34 may use the one or more received network weights and/or parameters and operate on the processor 22 to determine one or more pose metrics for one or more captured images and corresponding pose information/data. For example, the processor 22 may execute the pose metric network to analyze a captured image and a map projection gerenated based on estimated and/or observed pose information/data corresponding to the captured image to determine a pose metric. In an example embodiment, the remote apparatus 10 may continue to train the pose metric network to further refine one or more network weights and/or parameters and may provide updated network weights and/or parameters to one or more vehicle apparatuses 20 regularly, periodically, as the updated network weights and/or parameters provide a non-negligible difference in the determined pose metric, and/or the like.

Determining a Pose Metric

Once a pose metric network 34 is trained (e.g., the network weights and/or parameters are determined to a pre-defined and/or configurable level of convergence), the pose metric network may be used to determine a pose metric. For example, the input to the pose metric network 34 may be a captured image and the corresponding estimated and/or observed pose information/data. For example, an image capturing device 32 of a vehicle apparatus 20 may capture an image and the location sensor(s) 30 of the vehicle apparatus 20 may approximately simultaneously determine estimated and/or observed pose information/data for the vehicle apparatus 20 and/or the corresponding vehicle 5. For example, the vehicle apparatus 20 may comprise a real time clock and may cause the image capturing device 32 to capture an image and the location sensor(s) 30 to determine pose information/data in parallel, sequentially, and/or approximately simultaneously such that the image is captured and the pose information/data is determined in real or near real time with respect to one another. In another example, the vehicle apparatus 20 may use the processor cycles to cause the image capturing device 32 to capture an image and the location sensor(s) 30 to determine pose information/data in parallel, sequentially, and/or approximately simultaneously such that the image is captured and the pose information/data is determined in real or near real time with respect to one another. The estimated and/or observed pose information/data may be used to identify one or more map features from a geographic database, digital map, and/or the like in the vicinity of the vehicle apparatus 20 and/or the vehicle 5 at the moment the captured image was captured. The pose metric network 34 may then output a pose metric quantifying the similarity between the captured image and the map location as determined based on the estimated and/or observed pose information/data. In an example embodiment using a Siamese-encoder-decoder network representation, the pose metric is the value of the response of the individual Siamese networks (e.g., 82, 84).

In an example embodiment, the pose metric network 34 may operate on the vehicle apparatus 20 (e.g., processor 22) and provide a real time (or near real time) determination of pose metric. The vehicle apparatus 20 may then use the pose metric to make one or more decisions. For example, the vehicle apparatus 20 may determine one or more operational parameters based on the pose metric, wherein the one or more operational parameters are configured to control at least one aspect of the operation of the vehicle apparatus 20 and/or one or more components thereof. In an example embodiment, the pose metric may be used by the vehicle apparatus 20 to make one or more real time or near real time decisions. For example, the vehicle apparatus 20 may use the pose metric to determine if information/data being gathered by one or more sensors of the vehicle apparatus 20 is sufficiently and/or accurately-enough localized to provide the information/data to the remote apparatus 10 for use in updating map information/data. For example, if the localization of information/data captured by one or more sensors onboard the vehicle 5 is not of sufficient quality or accuracy, providing and/or transmitting the information/data to the remote apparatus 10 may result in wasted bandwidth and/or wasted processing resources at the remote apparatus 10. Thus, use of the pose metric may guide the vehicle apparatus 20 in determining when to provide sensor information/data to the remote apparatus 10. In another example embodiment, the pose metric may be used by the vehicle apparatus 20 to determine if the localization of the vehicle 5 as determined by the location sensors 30 (e.g., GNSS sensors, GPS sensors, IMU sensors, and/or the like) is sufficient for autonomous driving of the vehicle 5 and/or assisted driving of the vehicle 5. If the pose metric indicates that the localization of the vehicle 5 is not sufficient for autonomous driving, for example, the vehicle apparatus 20 may initiate use of one or more other localization techniques to provide sufficient localization of the vehicle 5. For example, the vehicle apparatus 20 may initiate the use of one or more photometric techniques and/or other localization techniques to improve the accuracy of the localization of the vehicle 5. In an example embodiment, if the pose metric indicates that the localization of the vehicle 5 as determined by the location sensors 30 is of sufficient accuracy for autonomously driving the vehicle 5, for example, the vehicle apparatus 20 may rely on the location sensors 30 to determine the localization of the vehicle 5 and not use photometric and/or other localization techniques to perform localization of the vehicle 5. For example, the vehicle apparatus 20 may use the processing capabilities that otherwise may have been used to unnecessarily perform a photometric-based localization to perform one or more other computing tasks. Thus, the pose metric may improve the functioning of the vehicle apparatus 20 by providing the vehicle apparatus 20 with information/data that the vehicle apparatus 20 can use to make informed decisions regarding use of processing capabilities, use of bandwidth, and/or the like.

In an example embodiment, the remote apparatus 10 may receive sensor information/data from one or more vehicle apparatuses 20 for processing for updating one or more digital maps, geographic databases, and/or the like. The received sensor information/data may comprise at least one instance of estimated and/or observed pose information/data and one or more captured images corresponding to the instance(s) of estimated and/or observed pose information/data. In an example embodiment, the remote apparatus 10 may determine one or more operational parameters based on the pose metric, wherein the one or more operational parameters are configured to control at least one aspect of the operation of the vehicle apparatus 20, one or more components of the vehicle apparatus 20, the remote apparatus 10, and/or one or more components of the remote apparatus 10. For example, the remote apparatus 10 may determine a pose metric corresponding to the sensor information/data to determine if the localization of the sensor information/data (e.g., the estimated and/or observed pose information/data) is of sufficient quality and/or accuracy that the sensor information/data may be used to update map information/data. If it is determined, based on the pose metric, that the localization of the sensor information/data is not of sufficient quality and/or accuracy, the remote apparatus 10 may not process the sensor information/data any further. If it is determined, based on the pose metric, that the localization of the sensor information/data is of sufficient quality and/or accuracy, the remote apparatus 10 may process the sensor information/data to update map information/data. Thus, in an example embodiment, the pose metric may be applied to improve the functioning of the remote apparatus 10 my preventing the use of processing capabilities to process sensor information/data that is not of sufficiently localized to be used for updating a digital map, geographic database, and/or the like. In an example embodiment, resulting digital map, geographic database, and/or the like maintained by the remote apparatus 10 may be more accurate as only accurately localized sensor information/data is used to update the digital map geographic database, and/or the like, thereby improving the functioning of vehicle apparatuses 20 in performing functions in which map information/data is used (e.g., route determinations, image-based localization, and/or the like). In an example embodiment, the remote apparatus 10 or other apparatus may determine the pose metric in a Cloud-based computing implementation and determine and provide one or more operational parameters for the vehicle apparatus 20 or provide the determined pose metric to the vehicle apparatus 20.

FIG. 6 provides a flowchart illustrating a process that may be completed, for example, by the vehicle apparatus 20 and/or the remote apparatus 10, to determine a pose metric. Starting at block 202, a captured image is captured and estimated and/or observed pose information/data of is determined. For example, the vehicle apparatus 20 may capture a captured image and determine estimated and/or observed pose information/data corresponding to the location and/or heading of the vehicle 5 and/or vehicle apparatus 20 at approximately the moment when the captured image is captured. For example, the vehicle apparatus 20 may comprise means, such as image capturing device 32, location sensor(s) 30 (e.g., GNSS, GPS, and/or IMU sensors), processor 22, memory 24, and/or the like, for capturing a captured image and determining estimated and/or observed pose information/data corresponding to the location and/or heading of the vehicle 5 and/or vehicle apparatus 20 at approximately the moment when the captured image is captured. In an example embodiment, the estimated and/or observed pose information/data may comprise geospatial coordinates (e.g., latitude and longitude, and/or the like) that are expected to represent the current physical location of the vehicle 5 and/or the vehicle apparatus 20 on board the vehicle 5 at approximately the moment the captured image is captured. In an example embodiment, the estimated and/or observed pose information/data may comprise a heading describing the direction the vehicle 5 is expected to be currently facing and/or heading with respect to a reference direction at approximately the moment the captured image is captured. For example, the estimated and/or observed pose information/data may comprise the expected angle between a reference direction (e.g., North and/or the like) and the direction in which the front of the vehicle 5 is directed. In an example embodiment, the captured image may be a single image, series of images, short video, and/or the like. In an example embodiment, the captured image may comprise red, green, blue (RGB); cyan, yellow, magenta, and black (cymk), or other multi-channel color information/data. In an example embodiment, the captured image may be a two-dimensional digital image, LiDAR image, 3D LiDAR image, RADAR image, (near-)IR image, 3D image, 360° image, and/or other image captured by one or more image capturing devices 32 onboard the vehicle 5.

In an example embodiment, the pose metric network 34 operates on the remote apparatus 10 and/or other apparatus (e.g., in a Cloud-based computing environment). In such an embodiment, at block 204, the captured image and the corresponding estimated and/or observed pose information/data is provided. For example, the vehicle apparatus 20 may provide (e.g., transmit) the captured image and the corresponding estimated and/or observed pose information/data. For example, the vehicle apparatus 20 may comprise means, such as the processor 22, communications interface 26, and/or the like, for providing the captured image and the corresponding estimated and/or observed pose information/data. The remote apparatus 10 may then receive the captured image and the corresponding estimated and/or observed pose information/data. For example, the remote apparatus 10 may comprise means, such as the processor 12, communications interface 16, and/or the like, for receiving the captured image and the corresponding estimated and/or observed pose information/data.

At block 206, the captured image is provided to an autoencoder network. For example, the autoencoder network may be a lane line detector, traffic sign detector, building facade detector, generic static feature detector, and/or the like used to extract feature information/data from the captured image to generate an encoded representation of the captured image. For example, the vehicle apparatus 20 and/or the remote apparatus 10 may provide the captured image to an autoencoder network to generate an encoded representation of the captured image. For example, the vehicle apparatus 20 and/or the remote apparats 10 may comprise means, such as the processor 12, 22, and/or the like, for providing the captured image to an autoencoder network to generate an encoded representation of the captured image. As noted above, in an example embodiment, the pose metric network 34 may learn to identify features within the captured image that correspond to map features in the corresponding map projection implicitly. Therefore, in an example embodiment, an encoded representation of the captured image may not be generated and the captured image itself (and/or an IPM thereof) may be provided directly to the pose metric network 34.

At block 208, a map projection is generated based on the estimated and/or observed pose information/data. For example, the vehicle apparatus 20 and/or the remote apparatus 10 may generate a map projection based on the estimated and/or observed pose information/data. For example, the vehicle apparatus 20 and/or the remote apparatus 10 may comprise means, such as processor 12, 22 and/or the like, for generating a map projection based on the estimated and/or observed pose information/data. For example, the map information/data may be accessed and the estimated and/or observed pose information/data may be used to determine, identify, and/or the like one or more map features from the map information/data that are expected to be present in the captured image based on the estimated and/or observed pose information/data. The map information/data corresponding to the determined, identified, and/or the like one or more map features may then be used to generate the map projection. For example, the map projection may provide an expected encoded representation of the captured image based on the map information/data and the estimated and/or observed pose information/data. In an example embodiment, an IPM map projection may be generated.

At block 210, the pose metric network 34 analyzes, compares, and/or the like the map projection and the captured image and/or encoded representation thereof. In an example embodiment, the pose metric network 34 analyzes, compares, and/or the like the IPM map projection and an IPM of the captured image and/or encoded representation thereof. For example, the vehicle apparatus 20 and/or the remote apparatus 10 may use the pose metric network 34 to analyze, compare, and/or the like the map projection and the captured image and/or encoded representation thereof. For example, the vehicle apparatus 20 and/or the remote apparatus 10 may comprise means, such as processor 12, 22, pose metric network 34, and/or the like, for using the pose metric network to analyze, compare, and/or the like the map projection and the captured image and/or encoded representation thereof. For example, the pose metric network 34 may implicitly compare one or more map features of the map projection and one or more features present in the captured image and/or the encoded representation thereof. For example, the pose metric network 34 may analyze the map projection and the captured image and/or the encoded representation thereof to determine the similarity between the map projection and the captured image and/or the encoded representation thereof. In an example embodiment, the pose metric network 34 may (implicitly) analyze one or more features present in the captured image and/or encoded representation thereof based on one or more map features present in the map projection.

In an example embodiment, one or more parameters, features, or characteristics of the image capturing device 32 may be taken into account when generating the encoded representation thereof and/or when analyzing, comparing, and/or the like the captured image and the map projection. For example, parameters or characteristics relating to the lens, shutter speed, aperture, light sensitivity, and/or the like of the image capturing device 32 may be accounted for when generating the encoded representation thereof and/or when analyzing, comparing, and/or the like the captured image and the map projection. For example, one or more parameters or characteristics of the image capturing device 32 that may cause warping of an image captured by the image capturing device 32 may be taken into account when generating the encoded representation thereof and/or when analyzing, comparing, and/or the like the captured image and the map projection.

Based on the analysis, comparison, and/or the like of the map projection and the captured image and/or encoded representation thereof, the pose metric network 34 my determined a pose metric corresponding to the estimated and/or observed pose information/data. For example, the pose metric may indicate how similar (or dissimilar) the captured image is from an expectation of the captured image based on the map information/data and the estimated and/or observed pose information/data. Thus, at block 212, a pose metric is determined. For example, the vehicle apparatus 20 and/or remote apparatus 10 may determine a pose metric. For example, the vehicle apparatus 20 and/or remote apparatus 10 may comprise means, such as processor 12, 22, pose metric network 34, and/or the like for determining a pose metric. In an example embodiment using a Siamese-encoder-decoder representation of the pose metric network, the pose metric is the value of the response of the individual Siamese networks (e.g., 82, 84).

At block 214, the pose metric may be provided. For example, the vehicle apparatus 20 and/or remote apparatus 10 may provide the pose metric. In an example embodiment, the vehicle apparatus 20 may provide (e.g., transmit) the pose metric (e.g., using the processor 22, communications interface 26, and/or the like) and the remote apparatus 10 may receive the pose metric (e.g., using the processor 12, communications interface 16, and/or the like), or vice versa. In an example embodiment, the vehicle apparatus 20 may provide the pose metric as input to one or more logical process used to determine if the estimated and/or observed pose information/data provides localization of the vehicle 5 that is of sufficient quality and/or accuracy for use in one or more processes. For example, the vehicle apparatus 20 my use the pose metric to determine if the localization of the vehicle 5 provided by the estimated and/or observed pose information/data is of sufficient quality and/or accuracy to provide sensor information/data associated with the estimated and/or observed pose information/data to the remote apparatus 10 for processing for updating a digital map, geographic database, and/or the like. For example, the vehicle apparatus 20 my use the pose metric to determine if the localization of the vehicle 5 provided by the estimated and/or observed pose information/data is of sufficient quality and/or accuracy to autonomously drive the vehicle 5, provide assisted driving of the vehicle 5, perform one or more route determinations, and/or the like, based (solely) on the estimated and/or observed pose information/data. In an example embodiment, the remote apparatus 10 may use the pose metric to determine if the localization of the vehicle 5 provided by the estimated and/or observed pose information/data is of sufficient quality and/or accuracy to process sensor information/data associated with the estimated and/or observed pose information/data for updating a digital map, geographic database, and/or the like. Thus, it should be understood that the vehicle apparatus 20 and/or the remote apparatus 10 may utilize the pose metric determined by the pose metric network 34 as input to one or more logical decision making processes that may be used to improve the efficiency and/or other functioning of the apparatus.

III. Example Apparatus

The vehicle apparatus 20 and/or remote apparatus 10 of an example embodiment may be embodied by or associated with a variety of computing devices including, for example, a routing and navigation system including an in-vehicle navigation system, a vehicle control system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as digital routing and map display. Additionally or alternatively, the vehicle apparatus 20 and/or remote apparatus 10 may be embodied in other types of computing devices, such as a server, a personal computer, a computer workstation, a laptop computer, a plurality of networked computing devices or the like, that are configured to update one or more map tiles, analyze probe points for route planning or other purposes. For example, in an example embodiment, the vehicle apparatus 20 is an in vehicle routing and navigation system on board a vehicle 5 and the remote apparatus 10 is a server that is remotely located with respect to the vehicle apparatus 20.

In this regard, FIG. 2A depicts a remote apparatus 10 and FIG. 2B depicts a vehicle apparatus 20 of an example embodiment that may be embodied by various computing devices including those identified above. As shown, the remote apparatus 10 of an example embodiment may include, may be associated with or may otherwise be in communication with a processor 12 and a memory device 14 and optionally a communication interface 16 and/or a user interface 18. Similarly, a vehicle apparatus 20 of an example embodiment may include, may be associated with, or may otherwise be in communication with a processor 22, and a memory device 24, and optionally a communication interface 26, a user interface 28, one or more location sensors 30 (e.g., a location sensor such as a GPS sensor; IMU sensors, and/or the like), one or more image capturing devices (e.g., camera(s); 2D and/or 3D LiDAR(s); long, medium, and/or short range RADAR; ultrasonic sensors; electromagnetic sensors; (near-)IR cameras, 3D cameras, 360° cameras and/or the like) and/or other sensors that enable the vehicle apparatus to determine one or more features of the corresponding vehicle's surroundings, and/or other components configured to perform various operations, procedures, functions or the like described herein. In an example embodiment, the vehicle apparatus 20 may further comprise a pose metric network 34. For example, the pose metric network may be a trained deep-net and/or neural network. For example, network weights and/or parameters for the pose metric network 34 may be provided (e.g., transmitted) to the vehicle apparatus 20 by the remote apparatus 10.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the remote apparatus 10 and/or vehicle apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executed instructions embedded within a link record of a map tile. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the remote apparatus 10 and/or vehicle apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, and/or the like).

The remote apparatus 10 and/or the vehicle apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the remote apparatus 10 and/or vehicle apparatus 20 of an example embodiment, a navigation system may also include or have access to a geographic database that includes a variety of data (e.g., map information/data) utilized in constructing a route or navigation path and determining the time to traverse the route or navigation path. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In an example embodiment, the data records (e.g., node data records, link data records, POI data records, and/or other data records) may comprise computer-executable instructions, a reference to a function repository that comprises computer-executable instructions, one or more coefficients and/or parameters to be used in accordance with an algorithm for performing the analysis, one or more response criteria for providing a response indicating a result of the analysis, and/or the like. In at least some example embodiments, the vehicle apparatus 20 may be configured to execute computer-executable instructions provided by and/or referred to by a data record. In an example embodiment, the remote apparatus 10 may be configured to modify, update, and/or the like one or more data records of the geographic database.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be updated based on information/data provided by one or more vehicle apparatuses. For example, the remote apparatus 10 may update the geographic database based on a most preferred version map tile as determined from a plurality of responses received from a plurality of vehicle apparatuses 20, as described elsewhere herein.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a routing and navigation system that embodies a vehicle apparatus 20 in accordance with an example embodiment may determine the time to traverse a route that includes one or more turns at respective intersections more accurately.

IV. Apparatus, Methods, and Computer Program Products

As described above, FIGS. 3 and 6 illustrate flowcharts of apparatuses 10, 20, method, and computer program product according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A routing and navigation system comprising:
   an image capturing device configured to capture a captured image;
   a location sensor configured to determine observed pose data that indicates the pose of the routing and navigation system when the captured image was captured;
   memory storing at least a portion of a geographic database comprising map data; and
   at least one processor configured to:
   generate a map projection from the map data based on the observed pose data, wherein the map projection is a binary projection;
   execute a pose metric network to:
   analyze the captured image and the map projection; and
   determine, based on the analysis of the captured image and the map projection, a pose metric, wherein the pose metric describes how similar the captured image is to the map projection; and
   determine one or more operational parameters based on the pose metric, the one or more operational parameters configured to control at least one aspect of the operation of the routing and navigation system.

2. A method comprising:
   capturing or receiving a captured image and corresponding observed pose data, wherein (a) the captured image is captured by an image capturing device onboard a vehicle, (b) the observed pose data is determined by a location sensor onboard the vehicle, and (c) the observed pose data indicates the pose of the vehicle when the captured image was captured;
   generating, via at least one processor, a map projection from map data of a geographic database based on the observed pose data, wherein the map projection is a binary projection;
   analyzing the captured image and the map projection using a pose metric network;
   determining, by the pose metric network and based on the analysis of the captured image and the map projection, a pose metric, wherein the pose metric describes how similar the captured image is to the map projection.

3. A method according to claim 2, wherein the pose metric describes how similar one or more image features within the captured image are to one or more corresponding map features within the map projection.

4. A method according to claim 2, further comprising generating an encoded representation of the captured image and wherein analyzing the captured image and the map projection comprises analyzing the encoded representation of the captured image and the map projection.

5. A method according to claim 2, further comprising generating an inverse perspective map of the captured image and wherein (a) the map projection is an inverse perspective map projection and (b) analyzing the captured image and the map projection comprises analyzing the inverse perspective map of the captured image and the map projection.

6. A method according to claim 5, further comprising generating an encoded representation of the inverse perspective map of the captured image and wherein analyzing the captured image and the map projection comprises analyzing the encoded representation of the inverse perspective map of the captured image and the map projection.

7. A method according to claim 2, further comprising determining, by the at least one processor, one or more operational parameters based on the pose metric, the one or more operational parameters configured to control at least one aspect of the operation of a routing and navigation system.

8. A method according to claim 2, wherein the pose metric network is a trained neural network, wherein the training of the neural network comprises:
   generating one or more instances of training data, wherein an instance of training data comprises (a) an encoded representation of an image, (b) correct pose data corresponding to the image, (c) incorrect pose data generated by modifying the correct pose data, (d) a correct map projection generated based on the correct pose data and the map data, and (e) an incorrect map projection generated based on the incorrect pose data and the map data;
   performing a first analysis, comprising analyzing a similarity between the correct map projection and the encoded representation of the image;
   determining the value of a correct loss function based on the first analysis;
   performing a second analysis, comprising analyzing a similarity between the incorrect map projection and the encoded representation of the image;
   determining the value of an incorrect loss function based on the second analysis;
   updating one or more network weights based at least in part on at least one of (a) the value of the correct loss function, (b) the value of the incorrect loss function, or (c) both the value of the correct loss function and the value of the incorrect loss function.

9. A method according to claim 8, wherein a Siamese-encoder-decoder representation of the neural network is used to train the pose metric network.

10. A method according to claim 8, wherein:
determining the value of the correct loss function comprises determining a pair-wise perpendicular distance between a first image feature present in the encoded representation of the image and a corresponding correct map feature present in the correct map projection, and
determining the value of the incorrect loss function comprises determining a pair-wise perpendicular distance between the first image feature present in the encoded representation of the image and a corresponding incorrect map feature present in the incorrect map projection.

11. A method according to claim 2, wherein the map data is accessed from a high definition (HD) map.

12. An apparatus comprising at least one processor, at least one memory storing computer program code, and a pose error network, the at least one memory and the computer program code configured to, with the processor, cause the apparatus to at least:
capture or receive a captured image and corresponding observed pose data, wherein (a) the captured image is captured by an image capturing device onboard a vehicle, (b) the observed pose data is determined by a location sensor onboard the vehicle, and (c) the observed pose data indicates the pose of the vehicle when the image was captured;
generate a map projection from map data of a geographic database based on the observed pose data, wherein the map projection is a binary projection;
analyze the captured image and the map projection using a pose metric network;
determine, by the pose metric network and based on the analysis of the captured image and the map projection, a pose metric, wherein the pose metric describes how similar the captured image is to the map projection.

13. An apparatus according to claim 12, wherein the pose metric describes how similar one or more image features within the captured image are to one or more corresponding map features within the map projection.

14. An apparatus according to claim 12, further comprising generating an encoded representation of the captured image and wherein analyzing the captured image and the map projection comprises analyzing the encoded representation of the captured image and the map projection.

15. An apparatus according to claim 12, further comprising generating an inverse perspective map of the captured image and wherein (a) the map projection is an inverse perspective map projection and (b) analyzing the captured image and the map projection comprises analyzing the inverse perspective map of the captured image and the map projection.

16. An apparatus according to claim 12, further comprising determining one or more operational parameters based on the pose metric, the one or more operational parameters configured to control at least one aspect of the operation of the apparatus.

17. An apparatus according to claim 12, wherein the pose metric network is a trained neural network, wherein the training of the neural network comprises:
generating one or more instances of training data, wherein an instance of training data comprises (a) an encoded representation of an image, (b) correct pose data corresponding to the image, (c) incorrect pose data generated by modifying the correct pose data, (d) a correct map projection generated based on the correct pose data and the map data, and (e) an incorrect map projection generated based on the incorrect pose data and the map data;
performing a first analysis, comprising analyzing a similarity between the correct map projection and the encoded representation of the image;
determining the value of a correct loss function based on the first analysis;
performing a second analysis, comprising analyzing a similarity between the incorrect map projection and the encoded representation of the image;
determining the value of an incorrect loss function based on the second analysis;
updating one or more network weights based at least in part on at least one of (a) the value of the correct loss function, (b) the value of the incorrect loss function, or (c) both the value of the correct loss function and the value of the incorrect loss function.

18. An apparatus according to claim 17, wherein a Siamese-encoder-decoder representation of the neural network is used to train the pose metric network.

19. An apparatus according to claim 17, wherein:
determining the value of the correct loss function comprises determining a pair-wise perpendicular distance between a first image feature present in the encoded representation of the image and a corresponding correct map feature present in the correct map projection, and
determining the value of the incorrect loss function comprises determining a pair-wise perpendicular distance between the first image feature present in the encoded representation of the image and a corresponding incorrect map feature present in the incorrect map projection.

20. An apparatus according to claim 12, wherein the map data is accessed from a high definition (HD) map.

21. A computer program product comprising at least one non-transitory computer-readable storage medium having computer-executable program code instructions stored therein, the computer-executable program code instructions comprising program code instructions configured to:
capture or receive a captured image and corresponding observed pose data, wherein (a) the captured image is captured by an image capturing device onboard a vehicle, (b) the observed pose data is determined by a location sensor onboard the vehicle, and (c) the observed pose data indicates the pose of the vehicle when the image was captured;
generate a map projection from map data of a geographic database based on the observed pose data, wherein the map projection is a binary projection;
analyze the captured image and the map projection using a pose metric network;
determine, by the pose metric network and based on the analysis of the captured image and the map projection, a pose metric, wherein the pose metric describes how similar the captured image is to the map projection.

* * * * *